United States Patent
Kirk

[15] 3,657,924
[45] Apr. 25, 1972

[54] MARINE ELECTRICAL SPEEDOMETERS

[72] Inventor: William H. Kirk, 1109 W. Selfridge, Clawson, Mich. 48017

[22] Filed: June 30, 1967

[21] Appl. No.: 650,269

Related U.S. Application Data

[63] Continuation-in-part of Ser. No. 433,323, Feb. 17, 1965, abandoned.

[52] U.S. Cl. ................................................................73/187
[51] Int. Cl. ..................................................................G01c 21/10
[58] Field of Search ..........................73/181, 185, 187, 231; 324/70 E

[56] References Cited

UNITED STATES PATENTS

| | | |
|---|---|---|
| 2,004,724 | 6/1935 | Herzog ............................324/115 |
| 2,103,606 | 12/1937 | Abrahamsohn et al................324/115 |
| 3,287,969 | 11/1966 | Hardy.....................................73/187 |
| 3,321,969 | 5/1967 | Spencer, Jr............................73/187 |

FOREIGN PATENTS OR APPLICATIONS

| | | | |
|---|---|---|---|
| 854,775 | 11/1960 | Great Britain | ..........................73/187 |
| 357,163 | 3/1938 | Italy | ....................................324/70 E |
| 502,516 | 11/1954 | Italy | ........................................73/189 |

Primary Examiner—Donald O. Woodiel
Attorney—Hauke, Gifford and Patalidis

[57] ABSTRACT

Marine speedometers having a submerged electrical generating unit electrically connected to a remotely located indicating unit. The generating unit comprises an impeller driven rotating magnetic field inducing an alternating current in a stationary winding which is connected, through a current rectifying electrical circuit, to an electrical meter forming the indicating unit.

17 Claims, 16 Drawing Figures

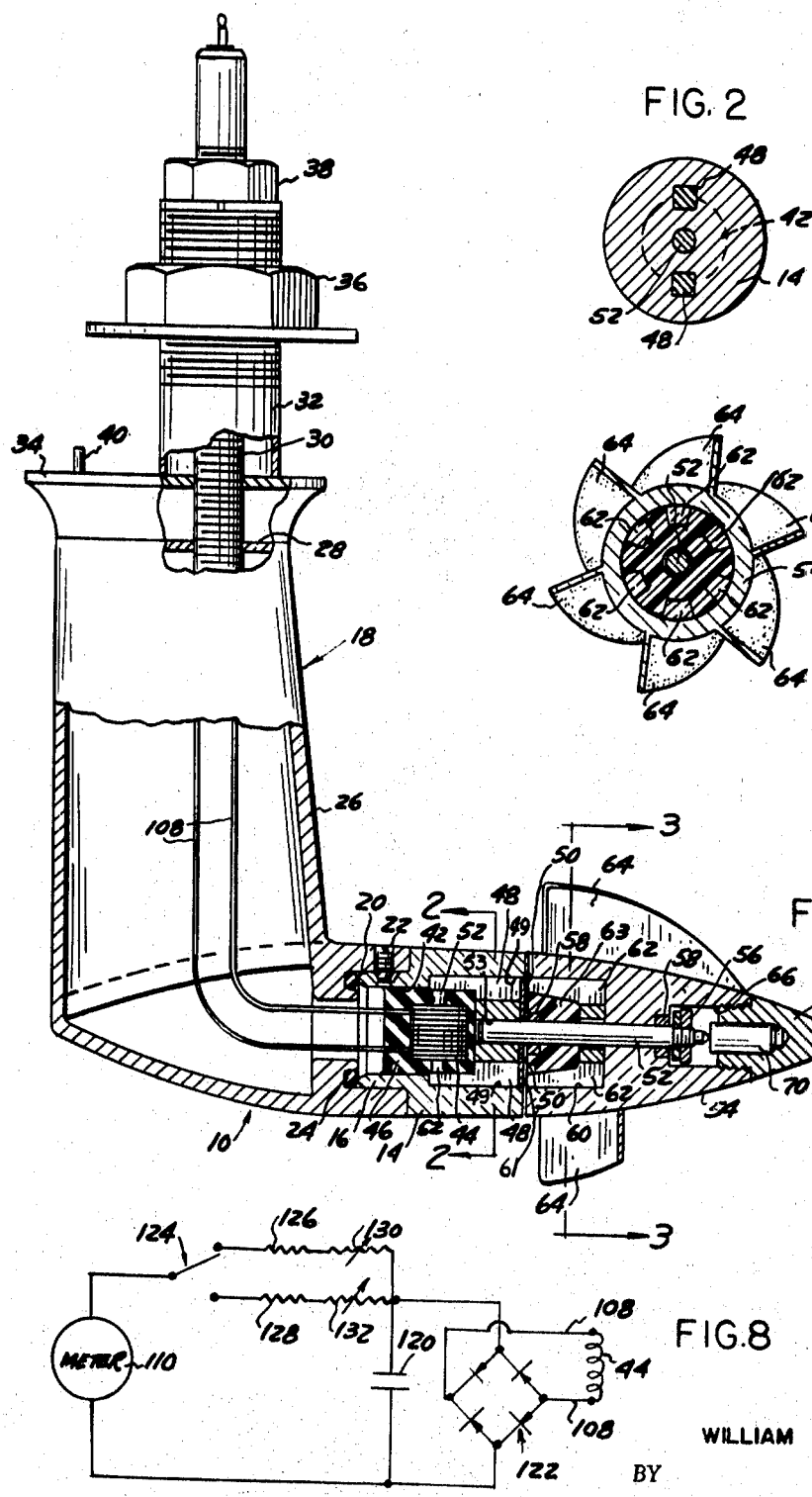

PATENTED APR 25 1972 3,657,924
SHEET 2 OF 3
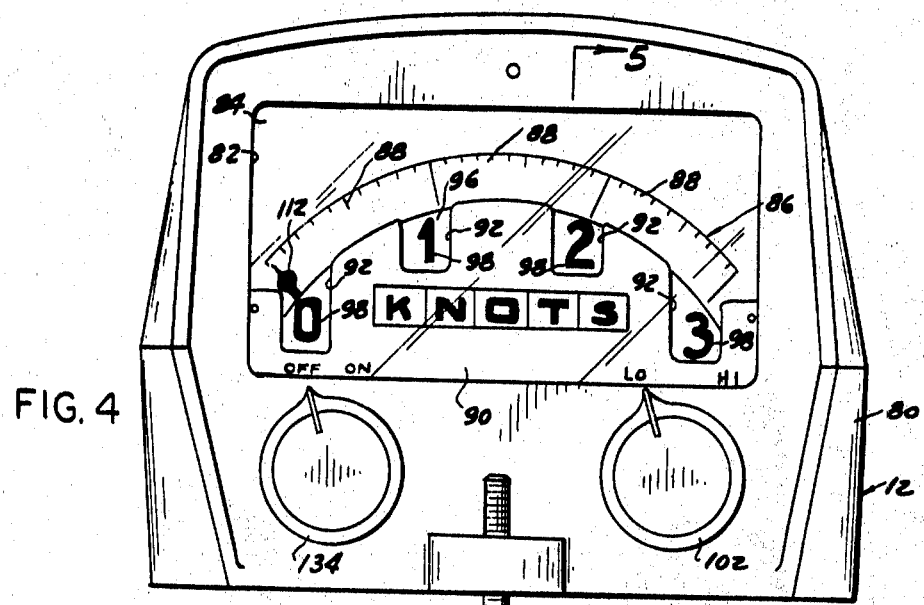
FIG. 4
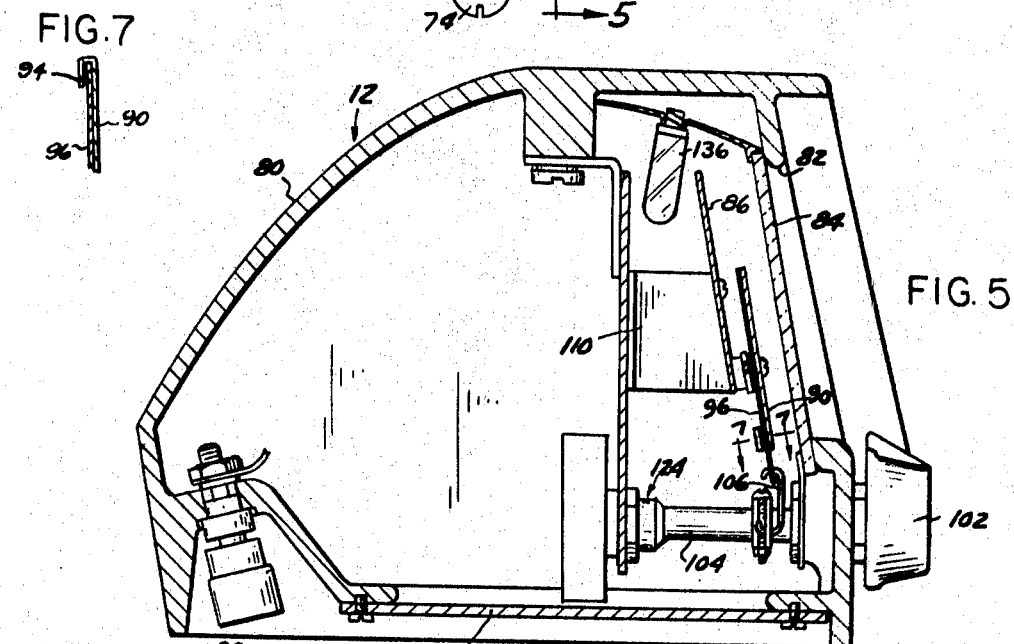
FIG. 7
FIG. 5
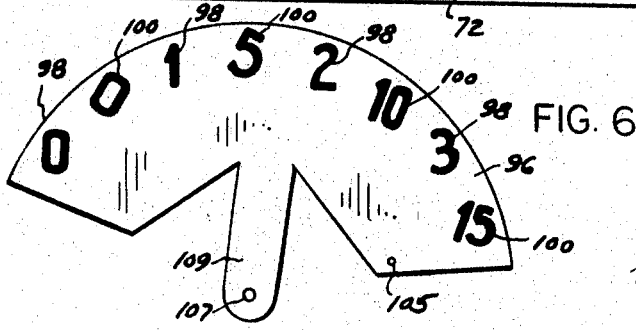
FIG. 6
INVENTOR.
WILLIAM H. KIRK
BY
Hauke, Kraus, Gifford, & Patalidis
ATTORNEYS

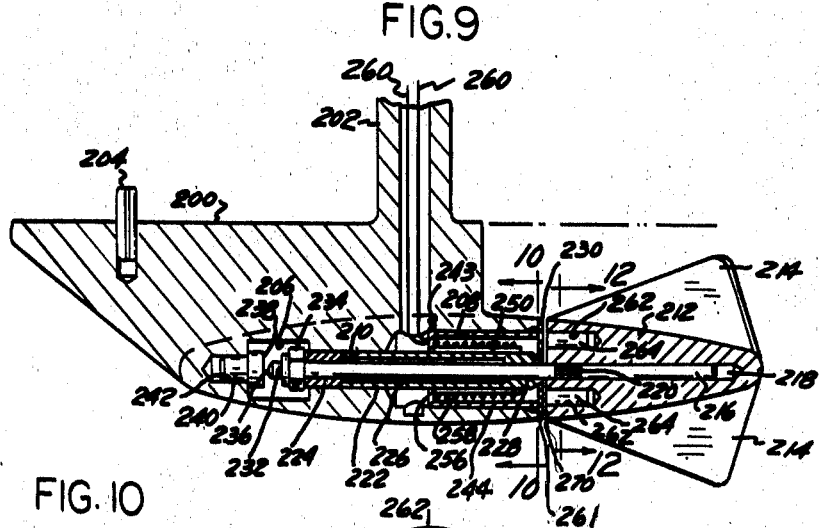
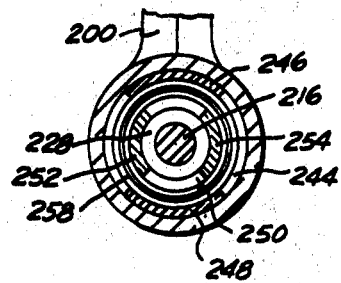
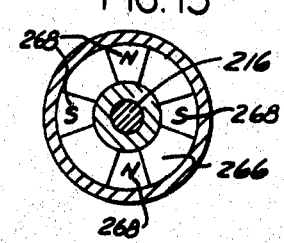
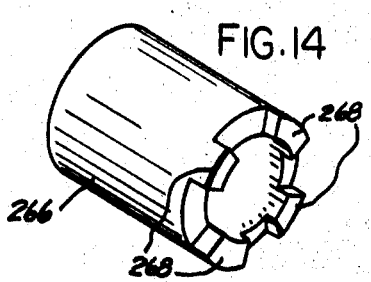
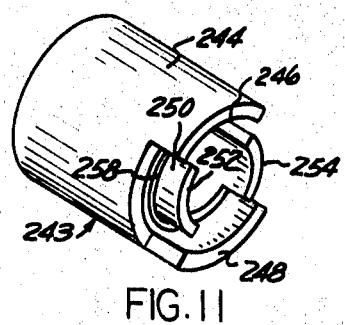
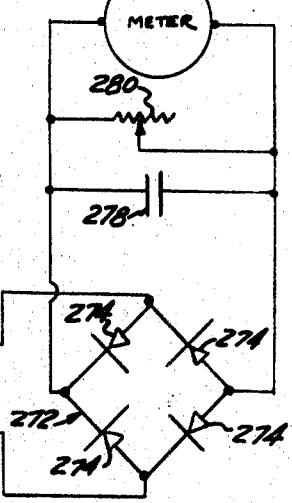
INVENTOR
WILLIAM H. KIRK

MARINE ELECTRICAL SPEEDOMETERS

CROSS-REFERENCE TO RELATED APPLICATION

The present application is a continuation-in-part of now abandoned application Ser. No. 433,323, filed Feb. 17, 1965.

BACKGROUND OF THE INVENTION

Heretofore several different types of systems for sensing and indicating the speed of marine craft and the like have been provided. These systems have generally taken one of three different basic forms. The first of these general types utilizes an impeller to sense the speed of the craft and a flexible shaft connected to the impeller to actuate a remotely positioned indicating means. Such systems are not very accurate especially at low speeds because of the frictional resistance to the rotating shaft.

The second general type of marine speed indicating means presently in use comprises the utilization of a Pitot tube for sensing the speed of the craft and some other type of means actuated in response to the changes in pressures produced within the Pitot tube to indicate the speed. Because the pressure changes in such tubes vary at a rate corresponding to the square of the speed, the indicating means must include some type of compensating device or a non-linear scale. For this reason such systems have been quite expensive to manufacture and have been quite inaccurate especially at low speeds.

The third general type of marine speed indicating systems comprises an electrical circuit including a magnetized impeller for sensing the speed of the craft and a separate circuit for amplifying the sensed fluctuations in current to actuate a meter indicating the speed of the craft. Such a system is much more accurate than the heretofore mentioned systems but has the disadvantage that a separate power source is required for the amplifying circuit. The seperate power generally comprises a set of dry cell batteries and it is of course necessary to periodically replace the batteries to keep the system in operating condition. This is an inconvenience and often results in the system being inoperative at a time when it is needed and when it is not possible or convenient to replace the depleted batteries.

The present invention provides a system having some analogy with the last mentioned system in that it is electrically actuated. Unlike the last mentioned system, however, the system of the present invention utilizes an impeller to drive a small electrical generator. The impeller is responsive to the speed of the craft and the generator produces an electrical current which varies substantially proportionally to the speed of the craft. The current produced by the generator is transmitted by way of appropriate current rectifying means to a meter which measures the amount of current produced by the generator and indicates this amount in terms of the speed of the craft. Since a separate amplifying circuit is not necessary, external power source and complicated electrical circuits are eliminated. This eliminates the possibility of the system being non-operable because of depleted batteries.

The prior art known to applicant further includes Gualandi Italian Pat. No. 502,516 and Hardy U.S. Pat. No. 3,287,969. Gualandi provides for an impeller driven hub rotating a shaft projecting within a housing. The shaft is supported in the housing by means of ball bearings and supports a rotating magnet forming an axial gap with a coil into which an alternating current is induced as a result of the rotation of the magnet. Such an arrangement is fragile and vulnerable as it must of necessity include sealing means preventing the introduction of water into the housing, and it includes no provision for adjusting the magnetic gap and requires precise alignment between the stationary parts, including the pole pieces of the coil, and the rotating parts, including the rotating magnet mounted on the shaft. Hardy provides for an impeller driven hub carrying a pair of U-shaped magnets forming an axial gap with the pole pieces of the coil core fixedly disposed in a housing. The coil core is made of laminated material and is U-shaped with the coil wound around the bridge portion connecting the two legs of the U-shaped core. The shaft on which the impeller driven hub is rotatably mounted projects from the housing and the hub is held in position by a washer and nut assembly such that there are two separate pair of surfaces in frictional engagement with one another with the resulting increase in friction and substantial possibility of dirt being introduced between rotating surfaces and resulting in preventing the hub from rotating freely.

The speedometers of the present invention provide for simple and rugged construction, for small size units having rotating parts endowed with substantially small inertia and, in addition, the speedometers of the present invention are constructed in a unique manner to produce only negligible friction losses so that even low speeds are indicated with a relatively high degree of accuracy. This is accomplished not only by the particular electrical actuating means employed but by an improved construction for the impeller and generator. The magnets are made of material such as ferrites and the like, and carried within a rotating hub which carries on its exterior surface the blades which form the impeller. The encapsulated and sealed electromagnetic coil is carried in a housing in a fixed position axially spaced from the magnets. Fixed magnetic core members direct the flux produced by the roating magnets to the electromagnetic coil. By utilizing the hub to carry both the impeller blades and the magnets, it is assured that the magnets rotate at exactly the same speed as the impeller and frictional losses due to rotating seals are eliminated. By fixing the coil and rotating the magnets relative to and axially spaced from the coil, the necessary electrical connections can be made with the coil without requiring expensive and friction-producing slip type connections. The particular arrangement and construction of the impeller and generator portions of the present system, moreover, permit these portions to be carried in a small streamlined compact housing so that the system itself does not interfere with the speed of the craft. In addition the structure of the invention permits adjustment of the axial magnetic gap for calibration purposes and provides means for compensating axial play in the rotating spindle.

A particular arrangement of the electrical system of the present invention permits ready adjustment for varying the effect that changes in the current produced will have on the indicating pointer of the sensing meter. This can be accomplished by providing means within the electrical circuit for selectively varying the effective resistance between the generator and the meter. To take advantage of this, the present invention provides a mechanical means actuated when the resistance in the circuit is varied to provide a new set of indicia on the indicator plate corresponding to the particular selected range of speed being indicated.

SUMMARY OF THE INVENTION

It is an object then of the present invention to improve marine speedometers by providing means generating an electrical current in accordance with the speed of the craft and means indicating the value of the current generated to thereby visibly indicate the speed of the craft.

It is another object of the present invention to improve the accuracy and reliability of marine speed indicating means and the like by providing a rotatably mounted hub member carrying magnets and provided with means to produce rotation of the hub member and the magnets in accordance with the speed of the marine craft, an electromagnetic coil carried in a fixed position axially spaced from the magnets, magnetic members directing the flux produced by the magnets to the electromagnetic coil, and meter means connected with the coil and indicating the current generated therein in terms of the speed of the craft.

It is still another object of the present invention to improve marine speedometers and the like by providing current generating means operable to generate an electrical current which varies in accordance with the speed of the craft, metering means to indicate the current generated in terms of the speed of the craft, means for providing an expanded speed indicating scale for low speed range or alternately for selectively varying the resistance between the generating means and the metering means to thereby vary the effect changes in current will have on the metering means and to provide a means for varying the range of speed indicated and means actuated by the resistance varying means to vary the indicia on the indicator plate of the metering means in accordance with the particular range of speed being indicated by the metering means.

Still further objects and advantages will readily occur to one skilled in the art to which the invention pertains upon reference to the following drawings in which like reference characters refer to like parts throughout the several view and in which:

BRIEF DESCRIPTION OF THE DRAWINGS

FIG. 1 is a longitudinal sectional view of the generator portion of a first preferred embodiment of a speedometer of the present invention;

FIG. 2 is a transverse sectional view taken substantially at line 2—2 of FIG. 1;

FIG. 3 is a transverse sectional view taken substantially at line 3—3 of FIG. 1;

FIG. 4 is a front elevational view of a first preferred embodiment of the indicating means of the speedometer of the present invention;

FIG. 5 is a cross sectional view taken substantially on line 5—5 of FIG. 4 with some portions illustrated in elevation and other portions removed for purposes of clarity;

FIG. 6 is a front elevational view of a portion of the structure shown in FIG. 4;

FIG. 7 is a fragmentary cross sectional view taken substantially on line 7—7 of FIG. 5 and enlarged somewhat for purposes of clarity;

FIG. 8 is a schematic illustration of a preferred electrical circuit for the system of the present invention for use in combination with the speed indicating unit of FIGS. 4–7;

FIG. 9 is a longitudinal sectional view of a modification of the generator portion of the speedometer of the present invention;

FIG. 10 is a transverse sectional view taken substantially at line 10—10 of FIG. 9;

FIG. 11 is a schematic perspective view of the coil magnetic core and pole pieces of the speedometer generator portion of FIG. 9;

FIG. 12 is a transverse sectional view taken along substantially line 12—12 of FIG. 9, with the impeller blades omitted;

FIG. 13 is a view similar to FIG. 12, but showing a modification of the hub magnet arrangement;

FIG. 14 is a schematic perspective view of the magnet arrangement of FIG. 13;

FIG. 15 is a schematic modified electrical circuit for the present invention; and FIG. 16 is a front elevational view of a modified indicating means for the speedometer of the present invention.

DESCRIPTION OF THE PREFERRED EMBODIMENTS

Now referring to the drawings for a more detailed description of the present invention, a first preferred embodiment of speed sensing and indicating system is illustrated as comprising a speed sensing means generally indicated at 10 in FIG. 1 and a speed indicating means generally indicated at 12 in FIGS. 4–5. The speed sensing means 10 is preferably connected with the indicating means 12 by the electrical circuit illustrated diagrammatically in FIG. 8.

As can best be seen in FIGS. 1–3, the speed sensing means 10 preferably comprises a cylindrical housing member 14 provided at one end with a reduced diameter axially annular flange portion 16. A hollow mounting structure 18 is provided with an internal annular recessed portion 20 adapted to receive the flange portion 16 of the housing member 14. A plurality of annularly spaced set screws 22 carried by the mounting structure 18 engage the flange portion 16 to secure the housing member 14 to the mounting structure 18. An O-ring seal 24 disposed intermediate the ends of the flange portion 16 and the recessed portion 20 prevents fluid leakage therebetween.

The mounting structure 18 preferably comprises an upstanding portion 26 terminating in an upper face 28 which closes the mounting structure 18. A tubular member 30 communicates with the interior of the mounting structure 18 and is secured to the mounting structure 18 so as to extend upwardly from the face 28.

Means for mounting the speed sensing means 10 to the underside of a marine craft or the like (not shown) are carried by the tubular member 30 and preferably comprise a hollow threaded tubular bolt 32 axially slidably receiving the tubular member 30 and having at its lower edge an enlarged flange portion 34. The bolt 32 is adapted to receive a flanged nut 36. The bolt 32 is secured to the tubular member 30 by a nut 38 received by the threaded upper end of the tubular member 30. The flange portion 34 is adapted to seat against the upper face 38 of the mounting structure 18 and a pin 40 may be provided if desired to insure proper positioning of the flange portion 34 with respect to the face 28.

The central housing member 14 is preferably provided with a cavity 42 registering with the interior of the mounting structure 18. An electromagnetic coil 44 is preferably substantially centrally positioned within the cavity 42 by means of an enveloping layer of rubber, plastic or similar material as indicated at 46. Rod-like magnetic core members 48 of a suitable magnetic material are carried on opposite sides of the coil 44 and extend longitudinally in appropriate cavities 49 in central housing member 14 from an area in registry with the cavity 42 to a point closely adjacent the free end of the central housing member 14. A cover plate 50 made of suitable nonmagnetic material closes the central housing member and forms a flat end face thereof. Radially extending magnetic members 52 magnetically connect the coil 44 with the core members 48.

A shaft 52 is fixed in the free end of the housing member 14 by having for example, one of its ends press fitted in an axial bore 53 and extends axially forwardly therefrom to provide the means for rotatably carrying a hub 54. The hub 54 is rotatably mounted on the shaft by means of a nut member 56 received by the threaded free end of the shaft 52 and a pair of axially spaced bearing sleeves 58. The end of the hub 54 adjacent the housing member 14 is provided with an axially extending cavity 60 which provides the means for carrying a plurality of individual axially extending and annularly spaced magnets 62. The magnets 62 are positioned with their poles alternately disposed flush with flat end face 61 of hub 54 and closely adjacent the end plate 50 of the housing member 14 so that, as the hub 54 is rotated, the lines of magnetic force produced by the magnets 62 are cut by the fixed magnetic core members 48. An enveloping layer of suitable plastic material as indicated at 63 fills the cavity 60 and encloses the magnets 62. The outer surface of the hub 54 is provided with a plurality of tapered and helically disposed fins 64.

The forward end of the hub 54 is provided with an internally threaded recess 66 which provides the means for receiving a nose member 68. The nose member 68 carries an insert 70 which is preferably constructed of nylon or the like and which upon tightening of the nose member 68 into the recess 66, engages the end of the shaft 52. The insert 70 permits the hub 54 to be moved axially slightly away from the housing member 14 upon tightening of the nose member 68 into the recess 66. This provides a fine adjustment to permit the hub 54 and housing member 14 to be separated sufficiently to eliminate friction therebetween and for adjusting the width of the magnetic gap between the magnet pole pieces and the ends of the axial magnetic core members 48.

As the invention has thus far been described, the speed sensing means 10 is adapted to be mounted to the underside of a marine craft or the like (not shown) by means of the bolt 32 and nut 36. The upstanding portion 26 of the mounting structure 18 positions the central housing member 14 and the hub 54 in a point spaced downwardly from the marine craft and with the hub 54 facing forwardly and with its axis aligned with the longitudinal axis of the craft. Thus as the craft moves through the water the fins 64 act to produce a rotation of the hub 54 at a speed which corresponds with the speed at which the craft is moving through the water. Rotation of the hub 54 acts through the magnets 62, the magnetic members 48 and 52 and the electromagnetic coil 44 to produce an electrical current which varies substantially linearly with respect to the speed of the rotating hub 54 and thus with the speed of the craft through the water.

Now referring to FIGS. 4-7 for a more detailed description of the speed indicating means 12 of the present invention a preferred construction is therein illustrated as comprising a substantially box-like housing structure 80 preferably having an open bottom closed by a plate 72 and adapted to be mounted to a marine craft or the like (not shown) by screws 74 or the like. The housing structure 80 is intended to carry some of the components of the electrical system shown diagrammatically in FIG. 8 and which will be described in detail below but most of these have been eliminated from FIGS. 4-5 for purposes of clarity.

As can best be seen in FIG. 5, the front face of the housing structure 80 is provided with an opening 82 preferably closed by a suitable transparent material 84 such as glass or the like. An indicator is carried within the housing structure 80 and is visible through the opening 82 and material 84 and preferably comprises a rearwardly mounted plate 86 having graduated indicia 88 as can best be seen in FIG. 4. A substantially arcuate plate 90 is mounted to the housing structure 80 in a position forwardly spaced from the plate 88 and is provided with a plurality of arcuately substantially equally spaced slots 92 which are spaced to coincide with larger lines provided in the indicia 88. As can best be seen in FIG. 7, the plate 90 is formed with a pair of slots 94 along its lateral edges and on its inner surface to provide the means for guiding the sliding movement of an arcuate plate 96.

The plate 96 is disposed within the slots 94 and is therefore positioned intermediate the plates 88 and 90 and is provided with two separate sets of indicia 98 and 100, as can best be seen in FIG. 6, which register with the slots 92 depending upon the pivotal position of the plate 96 relative to the plate 90. To provide for selective sliding movement of the plate 96 an actuating knob 102 is carried on the exterior end of a shaft 104 which is in turn rotatably carried by the housing structure 80. The shaft 104 is connected to a perforation 105 provided on one side of the plate 96 by a linking mechanism 106 so that upon rotation of the shaft 104 in one direction, the plate 96 is moved about a pin (not shown) which is carried by the housing 80 and extends through an opening 107 provided in a downwardly extending arm 109 of the plate 96 to a position in which the set of indicia 98 is presented through the slots 92, and rotation of the shaft 104 in an opposite direction moves the plate 96 pivotally to a position in which the set of indicia 100 is presented through the slots 92.

FIG. 8 illustrates schematically a preferred electrical circuit for the system of the present invention which includes the speed indicating means of FIGS. 4-7. The coil 44 is connected by electrical leads 108 to a circuit for a conventional electrical ammeter 110. As previously described, the coil 44 is carried in the central housing structure 16. The ammeter 110 is preferably carried in the housing structure 80 and is provided with a pointer 112, as best seen in FIG. 4, which is adapted to move along the graduated indicia 88. The electrical leads 108 preferably extend through the mounting structure 18 and the tubular member 30 and connect to two opposed points on a full wave rectifier bridge generally indicated at 122 which serves to convert the alternating current output of the coil to a direct current. A capacitor 120 is preferably connected across the other two bridge points to smooth out the pulsating direct current output of the bridge. The capacitor 120 is shunted by the series combination of the ammeter 110 and a range selecting and calibration circuit consisting of a double throw switching means 124, a pair of fixed resistors 126 and 128 and a pair of variable resistors 130 and 132.

The switching means 124 is operable to selectively connect the circuit to either one of two resistors 126 and 128. The resistors 126 and 128 are of different values so that by actuating the switching means 124 to select the proper resistor 125 or 128 the particular range of speed indicated by the meter 110 can be selected from two different ranges. The switching means 124 and the resistors 126 and 128 are preferably carried in the housing structure 80 and the switching means 124 is preferably connected with the shaft 104 so that rotation of the shaft 104 not only provides the proper indicia 98 or 100 visible through the opening 82, but also actuates the switching means 124 to select the proper resistor 126 and 128 for the selected range of indication. The trimming resistors 130 and 132 are connected in series with the fixed resistors 126 and 128 respectively to provide for fine adjustment of the resistance of the circuit, and to provide calibration means for adjusting the accuracy of the entire system.

A knob 134 may if desired be provided on the exterior surface of the housing structure 80 to provide the means for switching a lighting means 136 on and off.

In operation, the speed sensing means 10 is adapted to sense the speed of the marine craft as the craft moves through the water by generating an electrical current which varies with the speed of the craft. The meter 110 senses the current produced by the sensing means 10 and actuates the pointer 112 to a position corresponding to the particular value of current produced and the particular resistor 126 or 128 selected. The particular set of indicia 98 or 100 which corresponds with the particular resistor 126 or 128 selected is selected in a visible position such that the pointer 112 accurately indicates the speed of the craft.

The speedometer of FIGS. 1-8 provides a system which may be readily switched from a first range of speed indication to a second range of speed indication. Thus at low speeds the indicating means 12 can be actuated to provide indicia and response by the pointer for a range of speed between 0 and 3 knots for instance. For high speeds the indicating means 12 for example could be actuated to indicate a range of speed between 0 and 15 knots. Since no outside power source is necessary the system will never be inoperably because of depleted batteries.

Referring now to FIGS. 9-12, there is shown a modification of a speed sensing unit, according to the principle of the invention, provided with a substantially different structure from the one hereinbefore explained in detail, although capable of operating the speed indicating means precedently described as well as a speed indicating means hereinafter described in detail. The speed sensing unit of FIGS. 9-12 comprises a housing 200 substantially streamlined and adapted for mounting to a submarine portion of a marine craft, not shown, substantially by as the same means as previously described relatively to the embodiment of FIGS. 1-3. Housing 200 is made of a solid piece of molded material such as bronze or a plastic, and the like and, is provided with a mounting post 202 and an indexing pin 204 for adequate mounting upon a mounting plate, not shown, affixed to the marine craft hull. Housing 200 is provided with two separate longitudinal bores 206 and 208 longitudinally interconnected by way of a reduced diameter bore 210 and is adapted to rotatably support a hub 212 rearwardly disposed with respect to the normal direction of flow of the water in which the housing is submerged during normal operation of the device. Hub 212 is provided with a plurality of inclined impeller blades 214 adapted to rotatably drive hub 212 under the action of the water flow. Coaxially disposed so as to support hub 212, a shaft member 216 is press fitted in an axial bore 218 in the hub, serrations or knurls 220 being provided on a portion of the periphery of shaft 216 to insure a driving connection between the hub 212 and the shaft.

Shaft 216 is adapted to journal with respect to housing 200 by being supported therefrom by way of elongated sleeve bushing 222 and short sleeve 224. Elongated sleeve bushing 222 has an internal bore 226 for freely accepting shaft 216 therethrough, bore 226 having a reduced diameter shoulder portion 228 on the rear end thereof, as seen in the drawing, forming an appropriate bearing surface in which the shaft 216 is adapted to journal without play. As hereinafter explained in detail, a coil 258 and magnetic core 243 assembly is disposed in bore 208 in housing 200 around sleeve bushing 222. The remaining of the space in bore 208, which is closed by a flat end plate 230 through the center of which passes shaft 216, is filled with a potting compound, not shown providing appropriate electrical insulation and water-proofing of the interior of the housing such that no special precautions are required to seal water off the inside of the housing. The forward end of shaft 216 is supported by way of axial and thrust bearing short bushing 224, both bushing 224 and sleeve 222 being made preferably of a material such as nylon and being adapted to tightly fit within reduced diameter longitudinal bore 210 in housing 200.

The forward end of shaft 216 is provided with a threaded portion 232 and is held against longitudinal displacement by means of a nut 234 adapted to engage such threaded portion 232 of the shaft. Preferably, nut 234 has a substantial frictional meshing engagement with the threaded of threaded portion 232, or is provided with an appropriate plastic insert such that the nut remain locked, for all practical purpose, in any appropriate position that draws shaft 216 inwardly into the housing until the end 236 thereof just engages the end surface 238 of a shouldered plug 240 fitted in a reduced diameter bore portion 242 of bore 206. Plug 240 is also made preferably of a material such as nylon and if so desired, it may alternately consist of a threaded member engaging a threaded portion of bore 242 so as to be capable of providing longitudinal adjustment of the abutting surface 238 engaged by the forward end of shaft 216.

Longitudinally disposed in bore 208 there is a cup-like hollow magnetic core member 244, best seen in perspective schematic view in FIG. 11, provided with projecting pole pieces 246 and 248, within which is disposed a tubular magnetic core member 250 provided with projecting pole pieces 252 and 254. Cup-like magnetic core member 244 has an inwardly radially extending end flange portion 256 engaging the end of tubular member 250, and cup-like member 244 and tubular member 250, which are both made of a magnetic permeable material, together define the magnetic core, generally designated at 243, for a coil winding 258 wound around tubular member 250 in the space separating the outer surface of tubular member 250 with the inner surface of cup-like member 244. As illustrated at FIG. 11, the pair of pole pieces 246 and 248 of the hollow magnetic core member 244 are disposed on an imaginary diameter which is orthogonal to the imaginary diameter on which are disposed the pole pieces 252 and 254 of the inner tubular core member 250. Coil 258 is provided with a pair of leads 260 for electrical connection to an appropriate speed indicating means, which may be of the type hereinbefore described and shown at FIGS. 4-8 or, alternately, of the type to be hereinafter explained in detail.

The flat forward end face 261 of hub 212 is provided with a plurality of longitudinally elongated disposed cavities 262 concentrically and symetrically disposed about shaft 216. In each longitudinally disposed cavity 262 there is a permanent rod magnet 264, four of which are shown in FIG. 12. The permanent magnets 264 are alternately disposed with respect to magnetic polarity so as to present pole pieces of alternate polarity in opposition to the pole pieces 246, 248, 250, and 254 of magnetic core 243 of coil 258 during rotation of hub 212.

It can thus be seen that when hub 212 is rotated by inclined impeller blades 214 while the craft is moving in the water, a rotating magnetic field created by rotating magnets 264 contained in the hub is caused to induce into stationary coil 258 an alternating current of a frequency linearly dependent upon the speed of revolution of the hub.

FIGS. 13-14 depict an alternate construction of the magnet arrangement in hub 212, wherein the magnet consists of a substantially cylindrical, or frusto-conical, sleeve magnet 266 adapted to be imbedded in the material of hub 212 around shaft 216 and concentrically therewith, sleeve 266 being provided on its end proximate housing 200 with tooth-like projecting pole pieces 268 of alternate magnetic polarities.

The magnetic gap between the pole pieces of the coil core 243 and the pole pieces of magnets 264 or 266 in hub 212 which determines the voltage of the current induced in coil 258, such magnetic gap being indicated at 270 in FIG. 9, is precisely determined at the factory during assembly of the sensing unit, and remains consistent over a prolonged period of use. In order to reestablish the original gap, it is sufficient to rotate nut 234 in a direction that advances shaft 216 towards the left, as seen in the drawing, until its end 236 just engages the end surface 238 of plug 240. This adjustment is accomplished by introducing an appropriate tool through an access aperture, not shown, leading into bore 206 of housing 200, and by replacing, by cementing for example, the cover normally obturating such access aperture before returning the craft to the water after routine drydock inspection and maintainance of the hull.

It can be seen that the configuration of FIG. 9-14 provides for substantial protection of the rotating hub and impeller blades against damage as a result of collision with submerged objects in view of the fact that the forward portion of housing 200 acts as a leading edge and protector for the hub, rearwardly positioned with respect to the normal direction of motion of the craft. It can also be seen that in view of the streamlined shape of the housing there is a considerable reduction in the possibility of weeds and other stringy material becoming entangled with the impeller blades and interfering with or preventing the rotation of the hub. There is also very little possibility of dirt being introduced between the opposed adjoining surfaces of the housing and the hub at the gap 270, and any dirt which may tend to penetrate therebetween is thrown out as a result of the centrifugal force developed by hub 212 when rotating or by the rolling action between the stationary surface of the housing end and the rotating end surface of the hub.

Referring now to FIGS. 15-16, there is shown respectively an electrical circuit, including an electrical meter, and an appropriate electrical meter dial for use with the speed sensing unit of FIGS. 9-14 as well as the speed sensing unit of FIGS. 1-3. As shown in FIG. 15, the coil 258 of the speed sensing unit is connected by means of leads 260 across a diagonal of a full-wave rectifier bridge 272 comprising diodes 274. An ammeter 276 is connected across the other diagonal of the rectifier bridge so as to provide an indication of the current rectified by the bridge which is substantially proportional to the frequency of the current generated by coil 258, i.e., substantially proportional to the speed of the craft. A capacitor 278 is also connected across the output of bridge 272 for the purpose of smoothing out the pulsing direct current. An variable resistor 280 is connected in shunt across the meter such that only a portion of the rectified current passes through the meter and such that, by appropriate adjustment of the variable resistor, the meter may be appropriately calibrated to give an accurate indication of the speed at which the craft is moving with respect to the water.

As shown in FIG. 16, ammeter 276 is provided with a dial preferably calibrated in appropriate speed indication units, such as knots, and has preferably a non-linear scale comprising graduations 278 corresponding to speed indicating indicia 280. The meter pointer 282 is displaceable to the appropriate graduation indicating the speed of the craft, the graduated scale being such that a much greater distance separate consecutive graduations indicating substantially low speed as compared to the distance separating consecutive graduations indicating substantially high speed. Such a non-linear scale presents particular advantage for relatively slow marine craft such as sailing vessels where an accurate speed indicator for low speed is of great importance for precise navigation and in view of the normally relatively low speed of the craft under normal wind conditions.

The circuit of FIG. 15 is particularly designed to provide non-linear displacement of the pointer so as to provide an expanded scale giving greater displacement for one unit of speed at the low range of the instrument and shorter displacement of the pointer at the high range of the instrument. The circuit of FIG. 15 include diodes 274 preferably of the IN34A type or equivalent thereof, forming the rectifying bridge 272, a calibration variable resistor of 10 kohm, an ammeter 276 providing full scale deviation for 1 milliampere and a shunt capacitor 278 of 100 microfarad. The capacitor 278 acts partly as a bypass path for the unidirectional current pulses at the output of rectifier bridge 272 having relatively high frequency pulses when the craft is moving at substantially high speed, thereby allowing a relatively smaller portion of the total current to pass through the meter for high frequency pulsed currents detected by the bridge circuit, while allowing a greater proportion of the total current to pass through the meter for relatively low frequency pulsed currents detected by the circuit and corresponding to relatively low speed of the craft.

Having thus described the invention by way of examples of typical structural embodiments thereof, changes and modifications whereof will be readily apparent to those skilled in the art, what is sought to be protected by United States Letters Patent is as follows:

1. A speedometer for marine craft and the like comprising:
   a streamlined housing for mounting on said craft, said housing being normally submerged in water and having a flat end plate;
   a streamlined hub supported from said housing and having an end face proximate the end plate of said housing, said hub being freely rotatable relatively to said housing;
   impeller means dependent from said hub for rotating said hub when said craft moves relatively to said water;
   permanent magnets mounted in said hub proximate the end face thereof and about the axis of rotation of said hub with an end of each of said magnets proximate the flat end plate of said housing, said permanent magnets being defined by a hollow cylindrical member having at least a pair of pole pieces of alternate magnetic polarities oriented so as to form axially extending magnetic fields;
   an electrical coil in said housing;
   magnetically permeable core members in said housing each having an end proximate the flat end plate thereof axially spaced a short distance from the ends of said magnets in the hub to form a magnetic gap therewith and another end arranged to form a magnetic path to said coil;
   speed indicating means comprising an electrical meter connected to said coil for measuring the current induced in said coil as a function of the speed of rotation of said magnets mounted in said hub, said meter having a dial graduated in speed indicating indicia;
   a current rectifying circuit having an input connected across said coil and an output connected across said meter; and
   adjustable scale expanding means dependent from said circuit for enabling said meter to provide speed indications at a larger scale for low speed of said craft than for high speed of said craft 2. The speedometer of claim 1 further comprising:
   at least two current limiting resistors of different values,
   switch means for electrically connecting one of said resistors at a time in series between said meter and said current rectifying circuit so as to provide a variety of speed indicating ranges for said meter, and
   a shunt capacitor connected across the output of said rectifying circuit for reducing the ripple of the current at said output.

3. The speedometer of claim 2 further comprising:
   a variable resistor in series with each of said current limiting resistors for fine calibration of the speed indicating range of the meter corresponding to each of said current limiting resistors.

4. The speedometer of claim 3 further comprising:
   a scale of speed indicia for each speed indicating range of said meter, and
   means dependent from said switch means and operatively connected to each said scale of speed indicia for displaying the scale of speed indicia corresponding to the speed indicating range of said meter resulting from a predetermined resistor being switched in series between said meter and said current rectifying circuit.

5. The speedometer of claim 1 further comprising:
   an adjustable shunt resistor electrically connected across the meter for fine calibration of the speed indicating range of said meter.

6. The speedometer of claim 5 further comprising:
   a shunt capacitor electrically connected across the output of the current rectifying circuit for bypassing a greater proportion of the total pulsed current at such output at high frequency than at low frequency, and
   a non-linear speed indicating scale dial on said meter provided with an expanded low speed scale.

7. The speedometer of claim 1 wherein said magnetically permeable core members comprise:
   a pair of longitudinally disposed parallel magnetically permeable members each having an end proximate the flat end plate of said housing; and
   a transversely disposed magnetically permeable member in abutting juxtaposition with the other end of each of said longitudinally disposed member, said transversely disposed member having said coil wound therearound.

8. The speedometer of claim 1 wherein said hub is longitudinally adjustably positionable with respect to said housing for defining a predetermined axial magnetic gap between the ends of said magnets in said hub and the ends of said magnetically permeable core members in said housing.

9. A speedometer for marine craft and the like comprising:
   a streamlined housing for mounting on said craft, said housing being normally submerged in water and having a flat end plate;
   a streamlined hub supported from said housing and having an end face proximate the end plate of said housing, said hub being freely rotatable relatively to said housing;
   impeller means dependent from said hub for rotating said hub when said craft moves relatively to said water;
   permanent magnets mounted in said hub proximate the end face thereof and about the axis of rotation of said hub with an end of each of said magnets proximate the flat end plate of said housing, said permanent magnets being oriented so as to form axially extending magnetic fields;
   an electrical coil in said housing;
   magnetically permeable core members in said hosing each having an end proximate the flat end plate thereof axially spaced a short distance from the ends of said magnets in the hub to form a magnetic gap therewith and another end arranged to form a magnetic path to said coil;
   speed indicating means comprising an electrical meter connected to said coil for measuring the current induced in said coil as a function of the speed of rotation of said magnets mounted in said hub, said meter having a dial graduated in speed indicating indicia;
   a current rectifying circuit having an input connected across said coil and an output connected across said meter; and
   adjustable scale expanding means dependent from said circuit for enabling said meter to provide speed indications at a larger scale for low speed of said craft than for high speed of said craft;
   wherein said magnetically permeable core members comprise:
   a pair of coaxially disposed inner and outer tubular magnetically permeable members each having a first end proximate the flat end plate of said housing, said electrical coil being wound on the periphery of said inner member;

a radially extending flange portion dependent from one of said tubular member at a second end thereof remote from the end plate of said housing and arranged in abutting engagement with the other of said tubular member; and at least a pair of diametrically opposed tooth-like projecting pole pieces formed on the first end of said tubular members, the pair of pole pieces on the end of the inner tubular member being on a diameter substantially orthogonal to the diameter on which are disposed the pole pieces of the outer tubular member.

10. The speedometer of claim 8 wherein said hub is longitudinally adjustably positionable with respect to said housing for defining a predetermined axial magnetic gap between the ends of said magnets in said hub and the ends of said magnetically permeable core members in said housing.

11. The speedometer of claim 8 further comprising:
at least two current limiting resistors of different values,
switch means for electrically connecting one of said resistors at a time in series between said meter and said current rectifying circuit so as to provide a variety of speed indicating ranges for said meter, and
a shunt capacitor connected across the output of said rectifying circuit for reducing the ripple of the current at said output.

12. The speedometer of claim 11 further comprising:
a variable resistor in series with each of said current limiting resistors for fine calibration of the speed indicating range of the meter corresponding to each of said current limiting resistors.

13. The speedometer of claim 12 further comprising:
a scale of speed indicia for each speed indicating range of said meter, and
means dependent from said switch means and operatively connected to each said scale of speed indicia for displaying the scale of speed indicia corresponding to the speed indicating range of said meter resulting from a predetermined resistor being switched in series between said meter and said rectifying circuit.

14. The speedometer of claim 8 further comprising:
an adjustable shunt resistor electrically connected across the meter for fine calibration of the speed indicating range of said meter.

15. The speedometer of claim 8 further comprising:
a shunt capacitor electrically connected across the output of the current rectifying circuit for bypassing a greater proportion of the total pulsed current at such output at high frequency than at low frequency, and
a non-linear speed indicating scale dial on said meter provided with an expanded low speed scale.

16. The speedometer of claim 8 wherein said permanent magnets in said hub are at least a pair of rod magnets disposed symmetrically about the axis of rotation of said hub.

17. The speedometer of claim 8 wherein said permanent magnets in said hub are defined by a hollow cylindrical member having at least a pair of pole pieces of alternate magnetic polarities.

* * * * *

UNITED STATES PATENT OFFICE
CERTIFICATE OF CORRECTION

Patent No. 3,657,924          Dated April 25, 1972

Inventor(s) William H. Kirk

It is certified that error appears in the above-identified patent and that said Letters Patent are hereby corrected as shown below:

IN THE SPECIFICATION

Column 4, line 24, change "38" to -- 28 --

Column 6, line 9, change "125" to -- 126 --

IN THE CLAIMS

Column 10, line 56, change "hosing" to -- housing --

Signed and sealed this 29th day of August 1972.

(SEAL)
Attest:

EDWARD M. FLETCHER, JR.          ROBERT GOTTSCHALK
Attesting Officer                Commissioner of Patents